H. FRANKENBERG.
THERMOMETER.
APPLICATION FILED FEB. 13, 1909.

1,059,857.

Patented Apr. 22, 1913.

Witnesses:
Fannie Fisk
H. J. Suhrbier

Inventor
Herman Frankenberg
By his Attorneys

UNITED STATES PATENT OFFICE.

HERMAN FRANKENBERG, OF NEW YORK, N. Y.

THERMOMETER.

1,059,857.  Specification of Letters Patent.  Patented Apr. 22, 1913.

Application filed February 13, 1909. Serial No. 477,486.

*To all whom it may concern:*

Be it known that I, HERMAN FRANKENBERG, a citizen of the United States of America, residing in New York, in the borough of the Bronx, county and State of New York, have invented new and useful Improvements in Thermometers, of which the following is a specification.

This invention relates to thermometers, and more especially to that class of thermometers which are known as clinical or fever thermometers, the invention having for its object to show the graduating lines and numbers clearly and permanently on the glass body of the thermometer, without the liability of becoming gradually blurred and indistinct on cleaning the thermometer with acidulated or antiseptic solutions, so that the temperature can always be read off with great facility and accuracy; and for this purpose the invention consists of a thermometer in which the inclined side-surfaces at both sides of the front- or lens-portion are provided with two layers of glass of contrasting colors, the graduations and numbers being engraved into the upper layers of glass so that they can be read off on the lower layer of glass of contrasting color.

Figure 1:
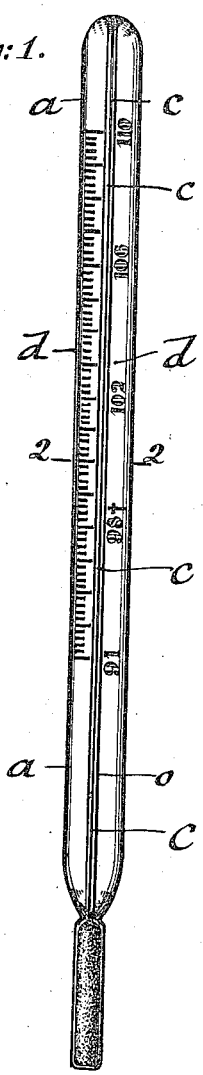
Figure 2:
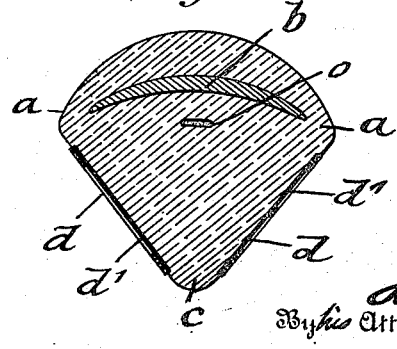

In the accompanying drawing, Figure 1 represents a front-elevation of a fever-thermometer provided with my improved means for quickly and permanently reading off the temperature, said figure being drawn on a larger scale, and Fig. 2 is a horizontal section on line 2, 2, Fig. 1, drawn on a greatly enlarged scale.

Similar letters of reference indicate corresponding parts.

Referring to the drawings, $a$ represents the prismatic body of a fever-thermometer which body is rounded at the front-end so as to form a magnifying lens $c$, and which has straight faces at each side of the same, and a rounded-off rear-portion. Into the rear-portion of the prismatic body $a$ is melted a layer $b$ of opaque glass, in front of which is arranged a flattened tubular opening $o$ for the mercury-thread. The interior opaque layer of glass is preferably made of milk or other glass of light color, so that a background is formed for the mercury-thread whereby the reading off of the temperature in connection with the magnifying front-portion is greatly facilitated in the well-known manner. The side-surfaces of the prismatic body $a$ are covered each with two superposed layers $d$ $d^1$ of glass, the lower layer being of a color contrasting with the color of the surface-layer. The lower layer $d^1$ may be made of yellow or other colored glass which contrasts with the surface-layer of white or other colored glass. On the white layers $d$ are engraved at one side, the graduations, and, at the other side, the numbers of the scale, as shown in Fig. 1. The etched graduations and figures stand out clearly and distinctly from the lower layer or background of different color, so as to be readily read off when the thermometer is used by the physician. By thus etching the graduations and numbers permanently in the side surfaces of the thermometer, the engraved graduations and numbers, which were heretofore filled up or coated with black varnish and which after some use were eaten out by the acidulated and antiseptic solutions used for cleaning the thermometer, are dispensed with. These partly- or entirely-effaced graduations and numbers render the fever-thermometer useless on account of their indistinct and illegible condition, while by the new arrangement clear and permanent graduations and numbers are obtained, which will never change their appearance during the use of the thermometer, as they will always stand out clearly and boldly from the backgrounds of contrasting colors applied to the side-surfaces of the body of the thermometer. This permanency of the graduations and numbers forms a valuable improvement for thermometers of this class, renders the same more useful to the medical profession and produces a considerable saving in expense as, owing to their durability, the frequent purchasing of new thermometers is obviated. The same construction may also be used with the glass-bodies of other articles, such as syringes, etc.

Having thus described my invention, I claim as new and desire to secure by Letters Patent:

1. A thermometer the body of which is provided at its front-portion with a lens and at each of side-faces of the same with two superposed layers of glass of contrasting color through the outer layers of which the graduations and numbers are etched.

2. A thermometer the body of which is formed at its front-edge with a lens and provided at both side-faces of the same with two superposed layers of glass, an outer layer of opaque light color and an inner layer of a color contrasting therewith, the graduations and numbers being etched through the outer layers so that they appear clearly on the inner layers or backgrounds of different color.

3. A thermometer comprising a glass-body having a layer of colored glass superposed thereon and a layer of colored glass of a contrasting color superposed upon the first layer and provided with graduations and numbers etched therethrough to expose the first colored layer, the glass of the body being unexposed by said graduations and numbers.

4. A clinical thermometer the glass body of which is provided at its front portion with a lens and at each of the side faces adjacent the lens with an outer layer of glass contrasting in color with the glass immediately beneath it, the graduations and numbers being etched through said layers respectively so as to expose the glass beneath the same.

In testimony, that I claim the foregoing as my invention I have signed my name in presence of two subscribing witnesses.

HERMAN FRANKENBERG.

Witnesses:
PAUL GOEPEL,
HENRY J. SUHRBIER.